Figure 1:
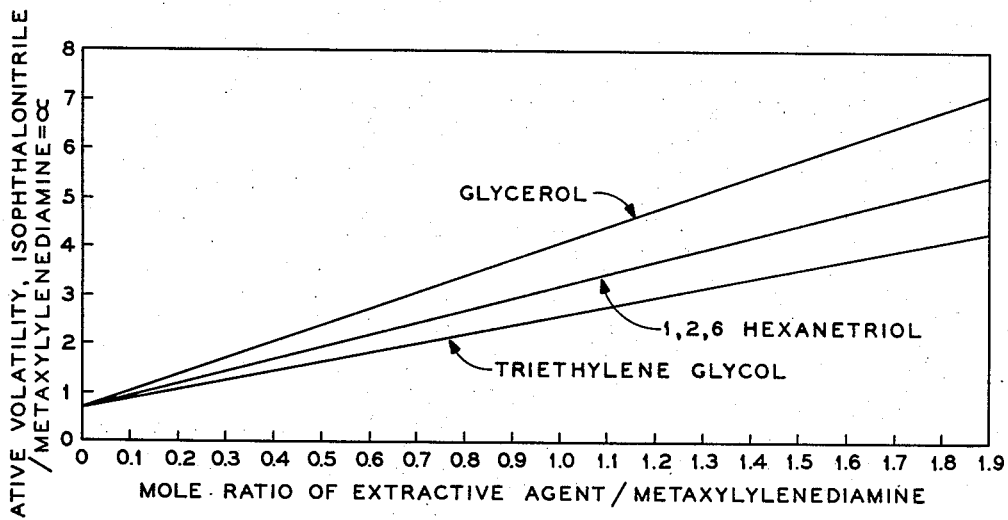

Aug. 18, 1959

R. S. VALENTINE 2,900,309

SEPARATION OF AROMATIC COMPOUNDS
BY EXTRACTIVE DISTILLATION
Filed Aug. 12, 1958

INVENTOR
RALPH S. VALENTINE
BY *L.E. Johnston*
*W.L. Hooper*
ATTORNEYS

United States Patent Office 2,900,309
Patented Aug. 18, 1959

2,900,309

SEPARATION OF AROMATIC COMPOUNDS BY EXTRACTIVE DISTILLATION

Ralph S. Valentine, San Pablo, Calif., assignor to California Research Corporation, San Francisco, Calif., a corporation of Delaware Application August 12, 1958, Serial No. 754,669

12 Claims. (Cl. 202—39.5)

This invention relates to the separation of aromatic compounds and, more particularly, to the separation of xylylene diamines from aromatic nitriles by extractive distillation.

The process of extractive distillation for separating one component from one or more other components of substantially the same boiling point contained in a mixture is well known. In such a process, the mixture is fractionally distilled in the presence of an extractive agent which has a preferential affinity for one or more of the components contained in the mixture and thereby changes the relative volatility ($\alpha$) of the components to such an extent that fractional distillation is feasible.

A process has recently been developed for the production of metaxylylenediamine which is a desirable intermediate in the production of synthetic plastics and fiber-forming polymers (see U.S. Patents 2,766,221 and 2,766,222 to Lum et al.). The process involves the hydrogenation of isophthalonitrile to the corresponding diamine. The crude product resulting from the hydrogenation reaction contains, in addition to the desired metaxylylenediamine, certain amounts of unreacted isophthalonitrile and the partially hydrogenated nitrile metacyanobenzylamine, both of which are undesirable from a product purity standpoint. In such a mixture, the normal relative volatility is so small that separation by conventional fractional distillation is precluded.

It has now been found that xylylene diamines can be separated from aromatic nitriles having a boiling point substantially the same as the diamines by employing specifically defined polyols as the extractive distillation agent.

According to the present invention, a mixture comprising xylylene diamines and aromatic nitriles having substantially the same boiling point is separated by first contacting said mixture with a liquid aliphatic polyol containing only carbon, hydrogen, and oxygen atoms. The polyol must have a boiling point above and be essentially inert to said diamines and aromatic nitriles. The mixture is contacted with an amount of polyol such that the relative volatility of the aromatic nitriles to the xylylene diamines is adjusted to above about 1.1 due to the affinity that said polyol has for the diamine. Separation is then effected between the aromatic nitriles and the diamines by fractional distillation.

As noted above, the process of the present invention is directed to the separation of the isomeric xylylene diamines from a mixture containing at least one of these diamines and aromatic nitriles. Although the present process is applicable to the separation of aromatic mono and polynuclear polyamines from aromatic nitriles, the process is particularly suited to the xylylene diamine-aromatic nitrile separation. As used herein and in the claims, the term "aromatic nitriles" includes aromatic mono and polynitriles. Illustrative of the purely cyano-substituted compounds contemplated within the scope of the aromatic nitriles are such compounds as isophthalonitrile, terephthalonitrile, 1,3,5-tricyanobenzene, as well as the polynuclear analogs thereof. Other than the cyano radicals, the aromatic nitriles of the feed may have additional substituents such as alkyl, amide, amine, ester groups, and the like. Examples of such compounds are the isomeric tolunitriles, cyanoethylbenzenes, dicyanotoluenes, dimethyl terephthalonitrile, meta-t-butyl isophthalonitrile, and metacyanobenzylamine.

In addition to the xylylene diamines and aromatic nitriles defined above, the initial feed can also contain other hydrocarbons such as paraffins, olefins, and the like that are essentially inert in the presence of the polyol extractive agent.

The polyol extractive agents of the present invention are aliphatic polyols containing only carbon, hydrogen and oxygen atoms in the molecules. Particularly effective agents are the straight and branched-chain aliphatic diols having a hydroxyl group in the alpha and omega position and the straight and branched-chain polyols having internal hydroxyl substitutions as well as on the alpha and omega carbon atoms. Also suitable extractive agents are those polyols having alkylene groups joined by ether linkages, such as triethylene glycol.

The aliphatic polyol extractive agent employed in the present process should also meet the following requirements: (1) Have a boiling point above both the xylylene diamines and the aromatic nitriles present in the feed mixture, (2) be a liquid under the conditions of temperature and pressure employed in the extractive distillation, and (3) be essentially inert under the conditions of extractive distillation.

With respect to this latter requirement, a distinction must be taken between chemical reaction and the preferential affinity exhibited by the extractive agent to one or more of the components in the mixture. It is believed that this affinity is due to the formation of hydrogen bonds between the polyol and the amine groups on the xylylene diamines and not to a chemical reaction, in the accepted sense, between them. This hydrogen bonding is apparently a coordination between hydrogen of the hydroxyl groups and nitrogen. Thus, the polyol agent must form these hydrogen bonds but should be essentially inert, that is, it should not either react chemically with, or catalyze the decomposition of the compounds to be separated.

It has been found that the amount of polyol employed in the present process should be sufficient to change the relative volatility of the aromatic nitriles to the xylylene diamines to a value above about 1.1.

The general procedure for practicing extractive distillation is well known in the art, and is generally executed by adding a relatively nonvolatile extractive agent, polyols in this case, to the upper portion of a fractionating column so that as the extractive agent flows down the column, it mixes with the liquids being fractionated and alters the volatility of those compounds which are most readily associated or complexed with the extractive agent. The feed rates and column temperatures are so adjusted that the component whose vapor pressure is least depressed (isophthalonitrile in the case of the isophthalonitrile-metacyanobenzylamine-metaxylylenediamine system to which the present process is particularly suited) is taken overhead and the fat extractive agent may be removed from the bottom of the still and stripped for recovery of the least volatile materials, in this case the metaxylylenediamine. It can be seen that in the three-component system, isophthalonitrile could be taken overhead and metaxylylenediamine as bottoms with metacyanobenzylamine being removed as an intermediate fraction. If such a high degree of separation is not required, temperatures can be adjusted so that both the isophthalonitrile and metacyanobenzylamine are removed overhead and the metaxylylenediamine as a bottoms product. As in ordinary distillation, a portion of the overhead product or products may be returned to the column after condensation as reflux, the reflux inlet being ordinarily positioned above the extractive agent feed inlet. The component or components coordinated with the extractive agent, here the diamine, is recovered by stripping, and the lean extractive agent is then recycled to the column. Preferably the recycle extractive agent is introduced at approximately the same temperature prevailing in the column at the point of introduction. The distillation may be conducted at substantially any desired pressure, atmospheric, subatmospheric, or superatmospheric, whichever is practical for the particular polyol extractive agent and feed mixture employed. However, in most situations, subatmospheric pressure is preferred.

The extractive distillation process of the present invention may be, and preferably is, carried out in a continuous manner, the feed mixture to be separated being continuously introduced to the column at a point below the extractive agent feed. In this operation, instead of heating the extract at the base of the column to supply the vapor to partially strip the descending fat extractive agent, a portion of the overhead vapors produced during regeneration of the extractive agent for recovery of the dissolved substituent in a separate fractionating column may be returned near the bottom of the extractive distillation column as a bottoms reflux.

The following examples illustrate the process of the present invention.

*Example 1*

A number of experimental extractive distillations were made upon mixtures of isophthalonitrile and metaxylylenediamine employing a variety of polyols as extractive agents. The isophthalonitrile-metaxylylenediamine mixtures contained up to about 10 percent by weight isophthalonitrile. The extractive distillation was carried out by heating an isophthalonitrile-metaxylylenediamine-polyol mixture in a batch glass distillation column that was equivalent to approximately one theoretical plate per foot of column. The results of these distillations are shown in Figure 1 wherein the mol ratio of the extractive agent to the metaxylylenediamine is plotted on the abscissa and the relative volatility ($\alpha$) of isophthalonitrile to metaxylylenediamine is plotted on the ordinate. From the figure it can be seen that the polyols, triethylene glycol, 1,2,6-hexanetriol, and glycerol all increased the relative volatility above 1.1 with a mol ratio of polyol to metaxylylenediamine of only about 0.25. Further, the decided preference for glycerol as the extractive agent of the present process is apparent inasmuch as an $\alpha$ value of 1.1 can be attained with an amount of glycerol such that the mol ratio of glycerol to metaxylylenediamine is only about 0.11. The metaxylylenediamine was easily separated from the polyol by simple distillation, and the polyol was found suitable for reuse.

The three polyols noted above all met the extractive agent requirements for the isophthalonitrile-metaxylylenediamine system in that they had boiling points above those of the components to be separated, were essentially inert under the extractive distillation conditions employed, and were liquids under these conditions.

In addition to the noted polyols, extractive distillations were attempted on isophthalonitrile-metaxylylenediamine mixtures employing polyols, Bisphenol A (p,p'-dihydroxy-diphenyl-dimethyl-methane) and the trimethylol-propane as the extractive agents. Both failed to act as suitable extractive distillation agents in that it was found that they reacted with isophthalonitrile and/or metaxylylenediamine.

*Example 2*

Figure 2:
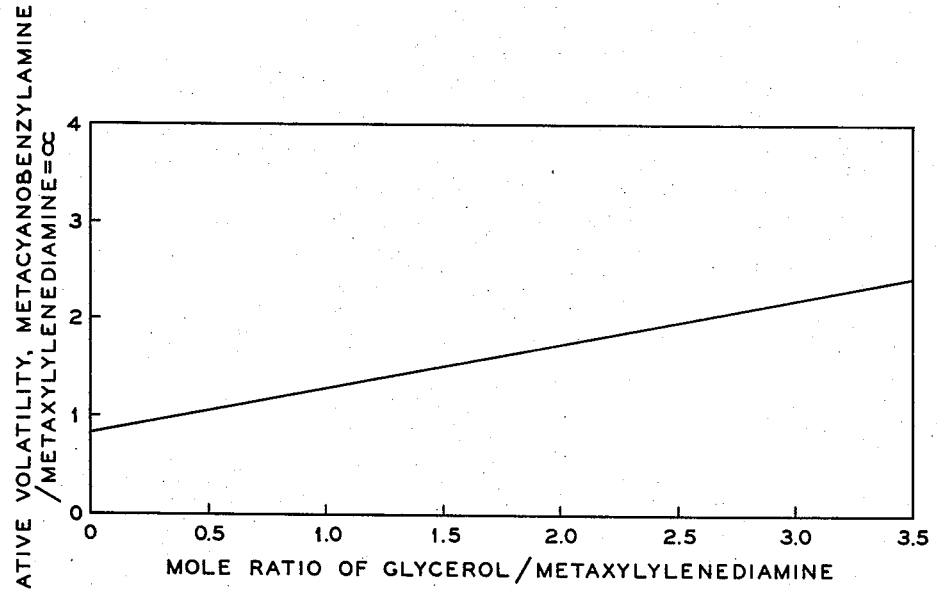

In a manner similar to that described in Example 1, the effect of varying amounts of glycerol upon the relative volatility of the metacyanobenzylamine-metaxylylenediamine binary system was determined and is shown in the accompanying Figure 2. The separation of these two compounds by polyol extractive distillation is more difficult than the separation in the isophthalonitrile-metaxylylenediamine system, since they have alkyl amino radicals on both compounds which form hydrogen bonds with the polyol solvent. However, as can be seen from Figure 2, separation of the two compounds can be effected by the process of the present invention since an $\alpha$ value above 1.1 is attained with sufficient polyol extractive agent. Thus, when the mol ratio of glycerol to the metaxylylenediamine is above about 0.5, separation is easily accomplished. However, in the metaxylylenediamine-metacyanobenzylamine-isophthalonitrile system, it is preferred that the mol ratio of the solvent to metaxylylenediamine be in the range of from about 0.6 to about 3.5, with a more highly preferred mol ratio being from about 0.75 to 2.5. Further, in this three component system, it is preferred that the polyol extractive agent have a boiling point above about 250° C. at atmospheric pressure.

From the foregoing description, it will be seen that the process herein described constitutes an efficient means for separating close boiling mixtures of xylylene diamines and aromatic nitriles, which mixtures have heretofore constituted a difficult separation problem.

The foregoing disclosure is not to be considered as limiting since many variations may be made by those skilled in the art without departing from the scope or spirit of the following claims.

I claim:

1. A process for separating xylylene diamines from a mixture comprising said diamines and aromatic nitriles which comprises subjecting said mixture to extractive distillation in the presence of a liquid aliphatic polyol containing only carbon, hydrogen and oxygen atoms, said polyol having a boiling point above and being essentially inert to said diamines and aromatic nitriles.

2. The process of claim 1 wherein the extractive distillation is conducted with an amount of said polyol such that the relative volatility of said aromatic nitriles to said xylylene diamines is above about 1.1.

3. The process of claim 1 wherein the xylylene diamines comprises metaxylylenediamine.

4. The process of claim 1 wherein the aromatic nitriles comprise metacyanobenzylamine.

5. The process of claim 1 wherein the polyol is glycerol.

6. A process for separating a mixture comprising close boiling xylylene diamines and aromatic nitriles which comprises contacting said mixture with a liquid aliphatic polyol containing only carbon, hydrogen and oxygen atoms, said polyol having a boiling point above and being essentially inert to said diamines and aromatic nitriles, said mixture being contacted with an amount of polyol such that the relative volatility of said aromatic nitriles to said xylylene diamines is adjusted to above about 1.1, and separating said xylylene diamines from said aromatic nitriles by fractional distillation.

7. The process of claim 6 wherein the polyol is glycerol.

8. The process of claim 6 wherein the xylylene diamines comprise metaxylylenediamine.

9. The process of claim 6 wherein the aromatic nitriles comprise metacyanobenzylamine.

10. A process for separating a mixture comprising metaxylylenediamine, metacyanobenzylamine and isophthalonitrile which comprises contacting said mixture with a liquid aliphatic polyol containing only carbon, hydrogen and oxygen atoms, said polyol having a boiling point above about 250° C. and being essentially inert to said metaxylylenediamine, metacyanobenzylamine and isophthalonitrile, said mixture being contacted with an amount of polyol such that the relative volatility of metaxylylenediamine to metacyanobenzylamine and isophthalonitrile is adjusted to above about 1.1, and separating metaxylylenediamine from metacyanobenzylamine and isophthalonitrile by fractional distillation.

11. The process of claim 10 wherein the polyol is glycerol.

12. The process of claim 11 wherein the mol ratio of the glycerol to the metaxylylenediamine contained in the mixture is in the range of from about 0.6 to about 3.5.

No references cited.